(12) United States Patent
Morselli et al.

(10) Patent No.: US 8,180,540 B2
(45) Date of Patent: May 15, 2012

(54) CONTINUOUSLY VARIABLE TRANSMISSION

(75) Inventors: Riccardo Morselli, San Vito di Spilamberto (IT); Paolo Ferracin, San Prospero Sul Secchia (IT); Alberto Berselli, Magreta (IT); Massimo Ronchetti, Modena (IT); Sara Bonacini, legal representative, Modena (IT)

(73) Assignee: CNH America LLC, New Holland, PA (US)

( * ) Notice: Subject to any disclaimer, the term of this patent is extended or adjusted under 35 U.S.C. 154(b) by 417 days.

(21) Appl. No.: 12/569,837

(22) Filed: Sep. 29, 2009

(65) Prior Publication Data

US 2010/0082207 A1 Apr. 1, 2010

(30) Foreign Application Priority Data

Sep. 30, 2008 (IT) .............................. BO2008A0595

(51) Int. Cl.
*F16H 61/02* (2006.01)
(52) U.S. Cl. .............. 701/60; 475/153; 476/1; 700/302; 73/115.02
(58) Field of Classification Search .................. None
See application file for complete search history.

(56) References Cited

U.S. PATENT DOCUMENTS

| | | | | |
|---|---|---|---|---|
| 4,282,955 A * | 8/1981 | Shimizu et al. ................. | 477/14 |
| 5,820,514 A * | 10/1998 | Adachi ........................... | 477/46 |
| 6,317,672 B1 * | 11/2001 | Kuramoto et al. .............. | 701/51 |
| 6,343,250 B1 | 1/2002 | Kuras | |
| 6,351,700 B1 * | 2/2002 | Muramoto et al. ............. | 701/51 |
| 6,387,009 B1 * | 5/2002 | Haka ............................... | 476/11 |
| 6,485,387 B1 | 11/2002 | Goodnight | |
| 6,839,617 B2 * | 1/2005 | Mensler et al. .................. | 701/61 |
| 6,859,709 B2 * | 2/2005 | Joe et al. ......................... | 701/51 |
| 6,973,379 B2 * | 12/2005 | Yamaguchi et al. ............ | 701/51 |
| 7,556,584 B2 * | 7/2009 | Souca ............................. | 476/53 |
| 7,568,996 B2 * | 8/2009 | Matsui et al. ................... | 477/46 |
| 2003/0135314 A1 * | 7/2003 | Saito et al. ...................... | 701/51 |
| 2004/0193350 A1 | 9/2004 | Pirotais | |
| 2005/0080527 A1 | 4/2005 | Tao | |

FOREIGN PATENT DOCUMENTS

WO WO 0043695 7/2000

OTHER PUBLICATIONS

Tanelli et al., On Transmission-Ratio Computation for the Control of a Continuously Variable Transmission in Agricultural Tractors, Jul. 2007, Proceedings of the 2007 American Control Conference (ACC '07), pp. 5730-5735.*

* cited by examiner

*Primary Examiner* — Thomas Black
*Assistant Examiner* — Lindsay M Browder
(74) *Attorney, Agent, or Firm* — Sue C. Watson; Patrick Sheldrake

(57) ABSTRACT

A continuously variable transmission can have one or more rotatable output shafts, rotatable non-output shafts, continuously variable transmission elements selectively interconnecting at least one non-output shaft and one output shaft so as to permit variation of a transmission ratio therebetween. The transmission can also have one or more control elements for controlling the instantaneously prevailing ratio of the transmission including a sensor device for sensing the rotational position of a non-output shaft, and a processing device for determining the rotational position of the sensed, non-output shaft at a chosen instant. The processing device is connected to control elements to cause variation of the transmission ratio so that the output shaft attains a desired rotational position at a chosen instant.

14 Claims, 2 Drawing Sheets

CONTINUOUSLY VARIABLE TRANSMISSION

This invention relates to a continuously variable transmission (CVT).

CVT's are widely used in many branches of automotive technology and especially in the case of large vehicles such as tractors, combine harvesters, farm loaders and so-called multipurpose farm vehicles. The invention is applicable to all such vehicles as well as to a range of other ground vehicles such as but not limited to self-propelled vehicles, military vehicles, passenger vehicles and commercial vehicles intended to carry freight on roads.

Especially in the case of agricultural vehicles the requirement frequently arises for carefully controlled, slow-speed manoeuvring. An example occurs when it is necessary to turn an agricultural vehicle such as a tractor or a harvesting machine either in a farm yard or in eg. a headland at the end of a field of crop. At such times the need is for manoeuvring at near-zero speed.

Agricultural vehicles have extremely powerful engines and therefore it is important to assure as accurate a transmission ratio selection as possible in order to minimise the risk of accidents and/or stalling of the vehicle engine through the selection of too high a transmission ratio.

To this end, the types of CVT typically employed in agricultural vehicles may be eg. electric, chain or belt CVT's (details of which will be familiar to the worker of skill in the art); or combinations of hydrostatic drives and planetary gear sets that are in themselves well known in the automotive engineering art. The invention is applicable in at least these transmission types.

It is recognised that a hydrostatic drive of the kind commonly encountered in an agricultural vehicle suffers from disadvantages when an attempt is made to use it in a near-zero speed mode. This is because although the hydrostatic drive is intended when used in conjunction with an appropriate control system to adjust the ratio of transmission through the drive in order to achieve eg. a chosen vehicle speed set point, the accuracy of the control function for various reasons that are inherent in the hydrostatic drive design becomes poor when slow speed manoeuvring is required.

Bearing in mind the size, mass and power of agricultural vehicles it is strongly undesirable that the control of slow speed manoeuvring may become inaccurate.

This problem is exacerbated when it is required to set the forward or reverse speed of such a vehicle to zero while the drive is engaged. In theory it should be possible to achieve this condition through setting the transmission ratio control lever controlling the hydrostatic drive to its minimum setting; but in practice the aforementioned control inaccuracy may nonetheless give rise to movement of the vehicle. Depending on the precise circumstances when such movement arises it may be undesirable or it may be positively dangerous.

Even in the case of a vehicle that does not include a hydrostatic drive as part of a CVT arrangement, there is a need for accurate, slow-speed transmission ratio control and transmission output control. Therefore, overall, an aim of the invention is to improve CVT control regimes compared with those available in the prior art.

One possibility for improving the accuracy of control is to provide a speed-sensing device that operates on the output shaft of a CVT. This device provides a feedback signal that can, in accordance with known control technology, provide for improved accuracy of the transmission output.

This solution however is distinctly sub-optimal partly because any sensing device and control circuit must be more accurate than the CVT under consideration in order to provide any benefit in terms of accuracy. Since typically the output of a CVT is a rotating shaft, the most suitable type of sensing device for providing a speed-related feedback signal is a Hall-effect sensor operating in conjunction with a tone wheel. The accuracy of such devices however is usually low at low rotational speeds.

The more accurate alternatives are somewhat expensive; they can be unreliable and often are not sufficiently robust for use in large vehicles. Generally speaking within the cost constraints associated with the design and construction of an agricultural vehicle it is impossible to justify the expense of high-cost sensors for the purpose of improving accuracy in a transmission feedback loop.

According to the invention in a broad aspect there is provided a continuously variable transmission comprising one or more rotatable output shafts, one or more rotatable non-output shafts, one or more continuously variable transmission elements selectively interconnecting at least one said non-output shaft and one said output shaft so as to permit variation of a transmission ratio therebetween, one or more control elements for controlling the instantaneously prevailing ratio of the transmission; one or more sensor devices for sensing the rotational position of at least one sensed, non-output shaft, and a processing device for determining the rotational position of at least one said sensed, non-output shaft at a chosen instant, the processing device being operatively connected to one or more said control elements to cause variation of the transmission ratio so that a said output shaft attains a desired rotational position at a chosen instant.

The inventors have found that employing a sensed rotational position reading of a non-output shaft, that may be an input shaft or another shaft of the CVT that is not a final, output shaft, provides more information than a control regime based for example on a speed measurement. The aim of the CVT of the invention in basing control on a requirement to attain a particular rotational position in a time t represents a more accurate form of control than merely specifying a set output speed for the duration of the period t (since in the latter case any error in the control caused eg. by impediments to movements of the vehicle in which the CVT is installed would result in failure to achieve the control objective with accuracy).

In a practical embodiment of the invention, however, it is preferable that the CVT includes two sensed, non-output shafts and two corresponding said sensor devices located for respectively sensing the rotational positions of the non-output shafts and the outputs of which sensor devices are fed to the processing device that calculates the said desired rotational position of a said output shaft based on the difference between the sensed rotational positions.

Such an arrangement advantageously renders the CVT of the invention inherently highly accurate when it is used to control vehicle speeds at near-zero values and indeed when considering the zero speed setting of a hydrostatic drive. This is primarily because the use of a difference signal as is generated in the CVT according to the preferred embodiment of the invention may be rendered highly accurate even if (for example because the accuracy of the sensor devices used is poor at low rotational speeds) the sensor devices are prone to error. We explain this inherent accuracy in more detail below.

It follows that a CVT according to the invention advantageously may be constructed with eg. two Hall-effect sensors, operating on non-output shafts to sense their rotational positions, with a higher degree of accuracy and at lower cost than if one were to try and install a highly accurate sensor device on an output shaft as suggested in the prior art.

Conveniently therefore sensor devices can be a Hall-effect sensor and tone wheel combination.

It is also preferable that the transmission includes a said Hall-effect sensor adjacent each said non-output shaft and each sensed, non-output shaft includes secured thereto one or more conducting masses, that on rotation of the non-output shaft periodically generates in a said Hall-effect sensor a current that is indicative of the rotational position of the associated said non-output shaft based on the number of conducting masses or parts thereof passing the respective Hall-effect sensor. In practical embodiments of the CVT of the invention the conducting masses are eg. metal protuberances secured at regular intervals about the periphery of a non-output shaft (or a component, such as a gear wheel or another disc, secured thereto); and indeed may be the teeth of a gear wheel.

Embodying the conducting masses in this manner advantageously means that the components of an existing CVT do not need to be modified extensively in order to permit construction of the apparatus of the invention.

Conveniently the processing device is programmable and is programmed to calculate the desired rotational position $\theta_3$ of the output shaft at a chosen instant t according to an algorithm that determines a weighted difference between the number of conducting masses, or a number proportional thereto, passing each Hall-effect sensor adjacent a respective non-output shaft.

Preferably the processing device is programmed to calculate the desired rotational position $\theta_3$ of the output shaft at a chosen instant t according to the expression $$\theta_3(t) = r_1 \theta_1(t) - r_2 \theta_2(t)$$

wherein $r_1$ and $r_2$ are known constants corresponding to the gear ratio between stages of the transmission;

$\theta_1$ is the rotational position of a first said sensed, non-output shaft at time t; and $\theta_2$ is the rotational position of a second said sensed, non-output shaft at time t. The constants $r_1$ and $r_2$ may, depending on the precise installation, be positive or negative constants, or under some circumstances one or other of them may have a zero value.

In a preferred embodiment of the invention the processing device is programmable and is programmed to calculate the desired rotational position $\theta_3$ of the output shaft at a chosen instant t according to the expression $$\hat{\theta}_3(t) = r_1 \frac{\pi}{N_1} n_1(t) - r_2 \frac{\pi}{N_2} n_2(t)$$

wherein $\hat{\theta}(t)$ represents an approximated rotational angular position value;

N is the number of conducting masses, or parts thereof, secured to each said sensed, non-output shaft n is the number of conducting masses, or parts thereof, that by time t pass an associated said Hall-effect sensor; and $r_1$ and $r_2$ are known constants, with the subscripts 1, 2 representing the first and second sensed, non-output shafts and the subscript 3 representing the output shaft.

As may be understood by the worker of skill in the art, an apparatus that operates on the basis of counting the passes of conducting masses past Hall-effect devices in order to determine rotational shaft positions will typically include pulse counters in the form of registers defined in eg. a memory partition of the processing device.

Such registers usually are capable of counting up to a maximum value before an un-readable, overflow condition arises. In the context of the invention however at any given time it may be necessary to establish the rotational positions of the non-output shafts after many thousands of revolutions (and hence after hundreds of thousands, or even millions, of Hall-effect pulses have been generated). Clearly under such circumstances the undesirable counter overflow condition would readily arise and could render the transmission difficult to use.

It therefore is desirable to prevent the counter overflow from arising. To this end in a further, optional refinement of the invention the processing device includes or is operatively connected to one or more counters that count the numbers of the conducting masses so as to generate respective values of n relating to the non-output shafts, wherein each said counter is capable of counting to a predetermined maximum value; and wherein the processing device is programmed to subtract from each said counter an integer value so as to prevent the respective counter values from reaching or exceeding their maxima.

More specifically each said integer value is calculated as the product of a gain term and a number, less than an associated said maximum, of times a said conducting mass or part thereof passes an associated said Hall-effect device, the respective said products equaling one another.

The effect of these features is, advantageously, to permit each counter to register at any time t a value that is indicative of the rotational position of one of the non-output shafts, without the absolute value thus registered ever exceeding the counter overflow limit.

In an alternative arrangement in accordance with the invention it is possible to re-set the counters eg. periodically or when the counter value in each case exceeds a predetermined threshold.

This may advantageously be achieved using an arrangement in which the processing device includes or is operatively connected to one or more counters that count the numbers of the conducting masses or parts thereof so as to generate respective values of n relating to the non-output shafts, wherein each said counter is capable of counting to a predetermined maximum value; and wherein the processing device is programmed to reset each said counter at a predetermined time while storing a value that is proportional to the measured rotational position of the output shaft so as to prevent the respective counter values from reaching or exceeding their maxima.

It further is preferable that in an alternative arrangement the processing device approximates the values of $\theta_1(t)$ and $\theta_2(t)$ according to the expression $$\hat{\theta}(t) = \theta(0) + \frac{\pi}{T_h N} \int_0^t v(\tau) d\tau$$

wherein $\hat{\theta}(t)$ represents an approximated rotational angular position value;

$\theta(0)$ represents an initial rotational position at time t=0;

$T_h$ is the length of pulses corresponding to the derivative v(t) of the output of the Hall-effect sensors;

N is the number of conducting masses secured to each said sensed, non-output shaft; and $v(\tau)$ is a signal derived from the output of each respective Hall-effect sensor whereby the processing device approximates the rotational position $\hat{\theta}_3(t)$ of the output shaft according to the expression:

$$\hat{\theta}_3(t) = r_1\hat{\theta}_1(0) - r_2\hat{\theta}(0) = \theta_3(0) + r_1\frac{\pi}{T_hN_1}\int_0^t v_1(\tau)d\tau - r_2\frac{\pi}{T_hN_2}\int_0^t v_2(\tau)d\tau$$

with the subscripts 1 and 2 representing the first and second sensed, non-output shafts; and the subscript 3 representing the output shaft.

When the processing device is arranged to operate according to the alternative expression set out above, the transmission optionally includes a respective monostable oscillator to which the output of each respective Hall-effect sensor is operatively connected whereby the output of each said monostable oscillator is a signal v(t) of constant pulse length $T_h$ for any rising and/or falling front of the Hall-effect sensor output signal h(t) at time t. In this regard, depending on the precise arrangement, the signal v(t) could be a pulse generated only at the rise, only at the fall or at the rise and the fall of the output of the Hall-effect sensor.

The integration steps indicated above may be carried out by analogue integrators constructed using operational amplifiers that may be eg. incorporated into the processor device or may be operatively connected thereto.

In a practical embodiment of the invention the transmission is operatively connected as part of a position control loop, of a wheeled and/or tracked vehicle, in which a signal representing a desired vehicle position $x_d(t)$ at time t is an input to a first control element of gain $R_p$, in which $R_p$ represents the ratio between a signal that is proportional to the rotational position of the output shaft; the output signal $g_{3d}(t)$ of the first control element is fed forwardly simultaneously to a position controller and via a control element of gain $Z_3$ as a gain-adjusted output of the first control element to a first summing junction, the output signal of the position controller being fed forwardly to the transmission and connected wheels or tracks of the vehicle, signals representing the rotational positions $n_1(t)$ and $n_2(t)$ of non-output shafts of the transmission being fed back via control elements respectively of gains $Z_1$ and $Z_2$ to a second summing junction in which a signal representing a weighted difference between the said rotational positions is generated, the said difference being further fed back to the first summing junction where it is subtracted from the gain-adjusted output of the first control element to define an error signal e(t) that is fed forwardly as an input to the position controller.

In more detail the position controller operates in accordance with the relation $$e(t) = Z_3 R_p x_d(t) - (Z_1 n_1(t) - Z_2 n_2(t)) =$$

$$Z_3 R_p x_d(t) - Z_3 \hat{g}_3(t) =$$

$$Z_3 R_p x_d(t) - Z_3 R_p \hat{x}(t) = Z_3 R_p (x_d(t) - \hat{x}(t)).$$

Conveniently the transmission is in a preferred embodiment of the invention installed in a ground vehicle, and especially a tractor, a mobile harvesting machine, a loader or a so-called multipurpose farm vehicle, such that one or more said output shafts is coupled so as to cause rotation of one or more ground-engaging wheels and/or tracks of the vehicle.

Overall the CVT of the invention offers considerably improved accuracy of control, especially during low-speed operation, at significantly reduced cost compared with the prior art.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE PREFERRED EMBODIMENT

Figure 1:
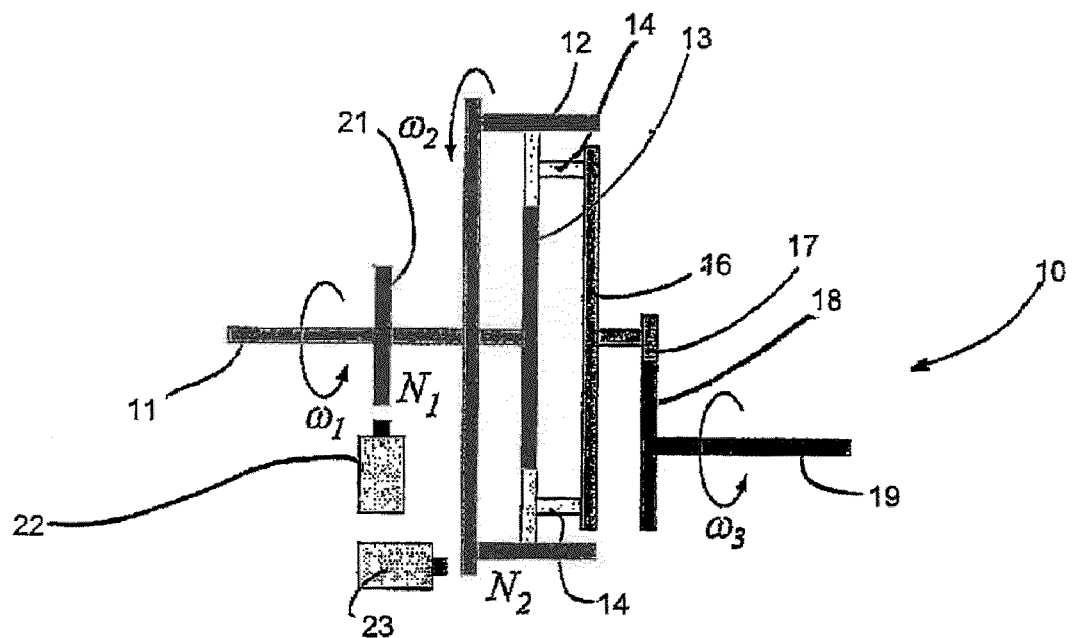
FIG. 1 is a schematic representation of a CVT, according to the invention, in the form of a planetary gear set.

Referring the drawings, FIG. 1 shows an example of a CVT of the type in which the principles of the invention may be embodied. FIG. 1 shows a planetary gear set 10. Gear set 10 is of a simple kind including a main input shaft 11 (that is coupled to the crankshaft of a spark-ignition or compression-ignition engine); a ring gear 12; sun gear 13; planetary gears 14 rotatably supported on a carrier 16; a final drive gear 17 coupled to the gear 18 of an output shaft 19; and, as is known in the CVT art, one or more hydrostatic drives (not shown in the drawings) for controlling the speed of the ring gear in order to provide for substantially smooth, continuously variable gear ratio changes.

The principles of the invention however are equally applicable in a more complicated form of CVT such as but not limited to a hydrostatic drive; or a composite transmission including plural planetary gear sets similar to the gear set 10 shown in FIG. 1 together with one or more hydrostatic or other types of drive.

Such transmission arrangements are in themselves known in the art and therefore do not require further, detailed description herein.

Input shaft 11 has rigidly secured thereto a tone wheel 21 that is a disc having secured on its outer periphery a series of equi-spaced electrically conducting protuberances (such as square cut teeth). Tone wheel 21 therefore may be constituted as or may resemble a gear wheel; or it may take a range of alternative forms. A first Hall-effect sensor 22 is arranged adjacent the tone wheel 21 so as to give rise to current pulses as each of the electrically conducting protuberances passes, in turn, on rotation of the input shaft 11 through the magnetic field of the Hall-effect sensor.

A second Hall-effect sensor 23 of similar construction to sensor 22 is located similarly to generate current pulses on rotation of the ring gear 12, the ring gear being provided with conducting protuberances (not shown in the drawing figure) in a similar manner to the protuberances on tone wheel 21. In the embodiment shown the protuberances are on the exterior face of the ring gear nearest the input shaft 11. Other arrangements are possible within the scope of the invention.

Input shaft 11 and ring gear 12 may be considered as respective, non-output shafts of the planetary gear set 10, it being evident from FIG. 1 that in use of the gear set 10 the rotational speeds of input shaft 11 and ring gear 12 will always differ from one another by reason either of the transmission ratio between sun gear 13 acting via planetary gear 14 on ring gear 12; or by reason of the speed of ring gear 12 being controlled (eg. by reason of having a hydrostatic drive connected to it) such that it rotates at a predetermined speed or, under certain circumstances, is stationary.

As a consequence, even at very slow speeds of rotation of the components of planetary gear set 10 the output current pulses of the respective Hall-effect sensors 22, 23 will be at sufficiently high frequencies as to permit a difference calculation that provides for accurate control in accordance with the aim of the invention.

The outputs of the Hall-effect sensors 22, 23 are transmitted during operation of the CVT of the invention to a processing device that operates in the manner described below. The processing device generates a control signal that in turn causes operation of a control element. The control element acts on the CVT so as to achieve a chosen rotational position of the output shaft 19 after a predetermined time interval t.

The control element may act for example to adjust the angle of a swash plate of the pump and/or the motor of a hydrostatic drive and/or may operate in any of a range of other ways, that will be known to the worker of skill, in order to achieve a desired, transmission-related control objective.

The Hall-effect sensor cables, the processor device and the control element are omitted from FIG. 1 for clarity; but the precise arrangement of these parts will be within the knowledge of the worker of skill.

Hall-effect sensors are, as is well known, extremely cheap components but they are conventionally used only to provide speed-related information (as a function of the frequency of the current pulses generated in the sensors). As indicated above, however, the use of speed sensors on the output shaft of a CVT is inaccurate at low vehicle speeds such as those employed when manoeuvring a farm vehicle.

An inherent advantage of using the non-output shafts indicated in FIG. 1 or equivalent shafts in other embodiments is that the shafts rotate at comparatively high speed, such that any Hall-effect error is insignificantly small.

The method of operation of the transmission of the invention is based on the use of two Hall-effect sensors on two shafts with faster speeds than an output shaft and computation of the position of the shaft with low/zero speed by using the gear kinematics constraints.

Referring to the example of FIG. 1, the kinematics relation between the shaft speeds $\omega_1$, $\omega_2$ & $\omega_3$ of input shaft 11, ring gear 12 and output shaft 19 is of the type:

$$\omega_3(t) = r_1 \omega(t) - r_2 \omega_2(t)$$

Where $r_1$ and $r_2$ are (typically, but not always, positive) known constants representing the transmission ratios between the parts of the gear set 10. In the transmission of the invention $r_1$ and $r_2$ are as close as possible to zero.

The same relation (with a proper choice of the initial condition) holds for the corresponding angular (rotational) positions $\theta_3$ (output shaft 19 position) $\theta_1$ (input shaft 11 position) and $\theta_2$ (ring gear 12 position):

$$\theta_3(t) = r_1 \theta_1(t) - r_2 \theta_2(t)$$

The control requirement in the FIG. 1 example is to control the position $\theta_3$. As explained, position $\theta_3$ is not measured by a sensor since to achieve a high level of precision a high cost sensor (eg. an optical-incremental sensor or a digital encoder) would then have to be used.

The above relation between the angular positions instead permits use of a measure of the positions $\theta_1$ and $\theta_2$ to arrive at the calculation of position $\theta_3$. The advantage of this is that if the transmission ratios $r_1$ and $r_2$ are close to zero, the measure of the position $\theta_3$ is accurate even if the measures of the positions $\theta_1$ and $\theta_2$ are not, as typically is the case when using tone wheels and Hall-effect devices.

Figure 2:
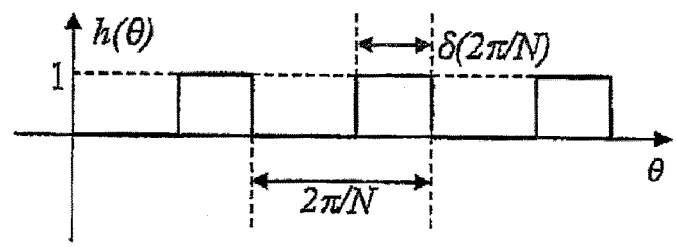
FIG. 2 shows in exemplary form the output of a Hall-effect sensor of the kind shown in FIG. 1.

Each Hall-effect sensor 22, 23 provides a signal $h(\theta)$ of the kind shown in FIG. 2, in which N is the number of teeth on the tone or gear wheel sensed, and $\delta$ is a coefficient between 0 and 1 that gives the normalized length of a tooth with respect to the distance between two adjacent teeth. The amplitude of the signal $h(\theta)$ is in the preferred embodiment of the invention assumed to equal 1 but this need not necessarily be so.

As the tone/gear wheel rotates the angle $\theta$ changes with time. Therefore the Hall-effect sensor provides a signal $h(t)$ with a shape that mimics the geometry of the wheel teeth. An example of this signal is shown in the upper part of FIG. 3. By processing the Hall-effect sensor signals in a monostable oscillator it is possible to obtain the signal $v(t)$ that has a pulse of constant length, say $T_h$, for any (rising and/or falling) front of the signal $h(t)$. The amplitude of the signal $v(t)$ is equal to 1.

Figure 3:
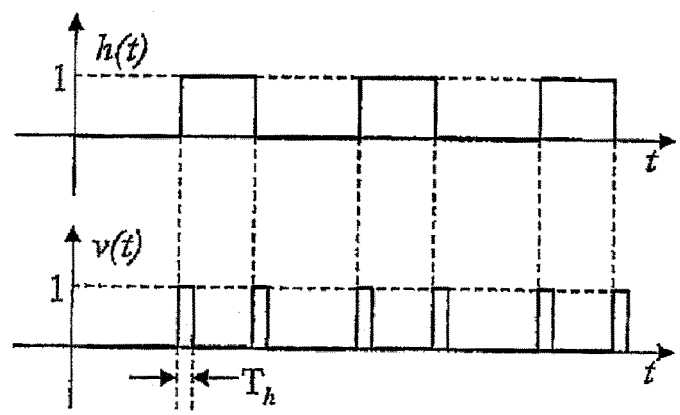
FIG. 3 shows the effect of processing the outputs of the Hall-effect sensors by parts of the CVT of the invention.

An example of a different signal, that is produced by some Hall-effect devices, is shown in the lower part of FIG. 3. Such devices are suitable for use in the apparatus of the invention, as are those whose outputs may take any of a range of other possible waveforms.

Broadly stated, in one aspect the invention resides in a transmission as aforesaid, including a processing device that is programmed to calculate the desired rotational position $\theta_3$ of the output shaft at time t based on the calculation of a weighted difference between the number of conducting mass rising/falling edges passing each Hall-effect device adjacent an associated non-output shaft. Two techniques for achieving this effect are described below.

As a result of the property of the function $h(\theta)$, the approximated measure of the rotation angle of each shaft is given in general by terms the following expression:

$$\hat{\theta}(t) = \theta(0) + \frac{\pi}{T_h N} \int_0^t v(\tau) d\tau$$

The foregoing integration operation can be achieved by an analog integrator based on operational amplifiers. The processor device may easily be constructed to contain or be connected to such an integrator.

If $\delta_1 = \delta_2 = 0.5$, the precision of this angular measure is of the order of a tooth equivalent angle, that is $\pi/N$:

$$|\hat{\theta}(t) - \theta(t)| \leq \frac{\pi}{N}$$

In general terms the rotational or angular position $\theta_3$ of an output shaft of the transmission of the invention at time t is determined in accordance with the invention by the expression:

$$\theta_3(t) = r_1 \theta_1(t) - r_2 \theta_2(t)$$

in which $r_1$, $r_2$, $\theta_1$ and $\theta_2$ are as defined herein.

Let us assume now that the input shaft tone wheel 21 and the ring gear 12 shown in FIG. 1 have $N_1$ and $N_2$ electrically conducting protuberances (teeth) respectively. By starting from the (known) initial condition:

$$\theta_3(0) = r_1 \theta_1(0) - r_2 \theta_2(0)$$

the estimation of the angular position $\theta_3$ is obtained as follows:

$$\hat{\theta}_3(t) = r_1\hat{\theta}_1(0) - r_2\hat{\theta}(0) = \theta_3(0) + r_1\frac{\pi}{T_hN_1}\int_0^t v_1(\tau)d\tau - r_2\frac{\pi}{T_hN_2}\int_0^t v_2(\tau)d\tau$$

This measure can be obtained by two analog integrators based on operational amplifiers. As stated these may readily be incorporated into or operatively connected to the processor device.

If $\delta_1=\delta_2=0.5$, the accuracy of this measure is about:

$$|\hat{\theta}_3(t) - \theta_3(t)| \le r_1\frac{\pi}{N_1} + r_2\frac{\pi}{N_2}$$

From the above equation it is clear that for high reduction ratios (ie. when $r_1$ and $r_2$ are close to zero), the precision of the measure is much higher than the one achievable by a simple tone/gear wheel mounted on the output axle. This is especially true if the position to be controlled is the position of one or more ground-engaging wheels or tracks at a low gear ratio.

The above estimation of the position $\theta_3$ can also be obtained also by a simple digital computation (or a digital integration). Let n(t) denote the integer number of rising and falling tooth edges that has passed near the sensor after time t=0. As a result of the properties of the signal v(t), it is clear that the following relation holds:

$$n(t) \cong n(0) + \frac{1}{T_h}\int_0^t v(\tau) = \frac{N}{\pi}\hat{\theta}(t)$$

From this expression it is possible to derive that:

$$\hat{\theta}_3(t) = r_1\hat{\theta}_1(0) - r_2\hat{\theta}_2(0) = r_1\frac{\pi}{N_1}n_1(t) - r_2\frac{\pi}{N_2}n_2(t)$$

As a consequence the position $\theta_3$ can be obtained by using the weighted difference between the number of pulses (ie. the number of teeth, or edges, detected) counted on the two input shafts.

As discussed above, the possibility of a counter overflow condition in the processing device is potentially problematic. The inventors have however devised two techniques for coping with this possibility so as to maintain the high position control accuracy of the transmission of the invention while eliminating the risk of an overflow arising.

Considering again the expression:

$$\hat{\theta}_3(t) = r_1\frac{\pi}{N_1}n_1(t) - r_2\frac{\pi}{N_2}n_2(t)$$

It is plain that the counters of the processing device must count the values of $n_1(t)$ and $n_2(t)$ respectively. The integer values of these quantities could exceed the counter maxima and cause an overflow condition.

In a first technique for avoiding this risk, once the value of $n_1(t)$ or $n_2(t)$ exceeds a threshold less than the associated counter maximum (or at another eg. programmed time) a respective integer quantity is subtracted from each of the two terms on the right hand side of the above expression, so as to bring the counter values back "within range". To establish the integer quantities, consider the rations $r_1$ and $r_2$ always to be ratios between two integer quantities. Let:

$$r_1 = \frac{P_1}{Q_1}$$
$$r_2 = \frac{P_2}{Q_2}$$

The estimate of the angular position can be rewritten as follows:

$$2Q_1N_1Q_2N_2\frac{\hat{Q}_3(t)}{2\pi} = P_1Q_2N_2n_1(t) - P_2Q_1N_1n_2(t)$$

in which $\theta_3/2\pi$ is the number of turns. Let $g_3=\theta_3/2\pi$. The above equation becomes:

$$2Q_1N_1Q_2N_2\hat{g}_3(t)=P_1Q_2N_2n_1(t)-P_2Q_1N_1n_2(t)$$

by choosing the symbols:

$$Z_3\hat{g}_3(t)=Z_1n_1(t)-Z_2n_2(t)$$

where $Z_1$, $Z_2$ and $Z_3$ are integer numbers. Now, $n_1(t)$ and $n_2(t)$ can be expressed as:

$$n_1=n_1^{new}+n_1^{owf} \quad n_2=n_2^{new}+n_2^{owf}$$

By choosing $n_1^{owf}$ and $n_2^{owf}$ such that:

$$Z_1n_1^{owf}=Z_2n_2^{owf}$$

Then:

$$Z_3\hat{g}_3(t)=Z_1n_1(t)-Z_2n_2(t)=Z_1n_1^{new}(t)-Z_2n_2^{new}(t)$$

In this relation the value of the position $\theta_3$ is the same as before the correction but the two counters each have a new (ie. lower) value. Note that by choosing:

$$n_1^{owf}=kZ_2 \quad n_2^{owf}=kZ_1$$

where k is an integer number, then all the numbers in the following two expressions are integers:

$$n_1=n_1^{new}+n_1^{owf} \quad n_2=n_2^{new}+n_2^{owf}$$

therefore the counter overflow can be dealt without losing the accuracy that is an advantage of the invention.

A different method to cope with the counter overflow is to reset both counters at a particular time and keep the old value of $g_3$. Starting from equation:

$$2Q_1N_1Q_2N_2\hat{g}_3(t)=P_1Q_2N_2n_1(t)-P_2Q_1N_1n_2(t)$$

let $t_0$ be a time instant. Since:

$$2Q_1N_1Q_2N_2\hat{g}_3(t_0)=P_1Q_2N_2n_1(t_0)-P_2Q_1N_1n_2(t_0)$$

let:

$$n_1^{new}(t)=n_1(t)-n_1(t_0) \quad n_2^{new}(t)=n_2(t)-n_2(t_0)$$

then:

$$2Q_1N_1Q_2N_2\hat{g}_3(t)=2Q_1N_1Q_2N_2\hat{g}_3(t_0)+P_1Q_2N_2n_1^{new}(t)-P_2Q_1N_1n_2^{new}(t)$$

where the first term on the right hand side of the equation above is a constant to be stored. This second method is especially interesting when a non-constant position has to be controlled using the transmission of the invention. The programmable device of the apparatus of the invention however may be programmed to carry out either of the counter overflow methods.

Figure 4:
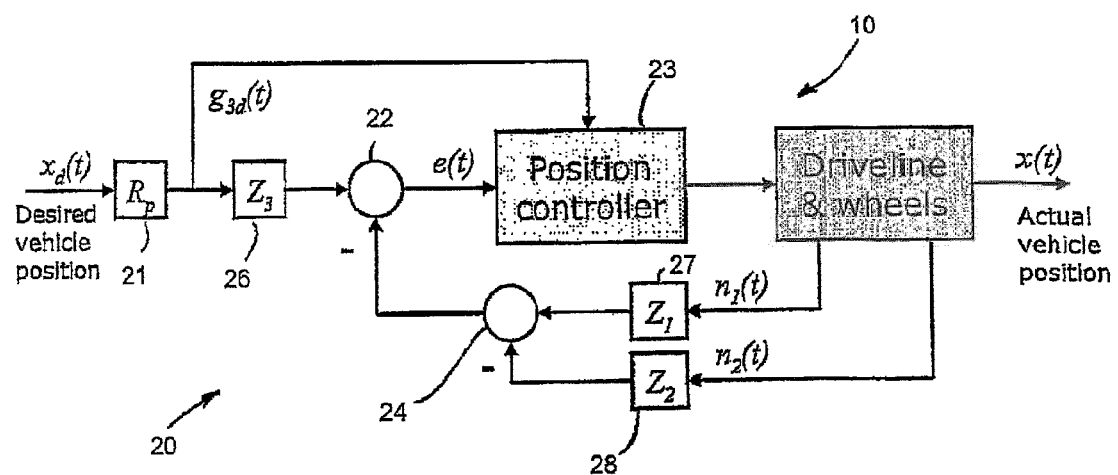
FIG. 4 is a schematic representation showing incorporation of a transmission such as that shown in FIG. 1 as part of a position control loop of a vehicle.

As shown in FIG. 4 a transmission 10 according to the invention may be incorporated as part of a programmable control loop 20 that is programmed in accordance with the principles described herein to provide accurate, position-based control of a wheeled or tracked vehicle.

In FIG. 4 a control element (not shown) such as a lever or a knob in a driver's cab may be used to set a desired vehicle position $x_d(t)$. This desired position may be generated as an electrical signal that is an input to a control element 21 having a gain $R_p$.

$R_p$ is the ratio between $g_3$ defined above $$\left(g_3 = \frac{\theta_3}{2\pi}\right)$$

and the actual vehicle position x(t).

The output of control element 21 is a signal $g_{3d}(t)$, ie. a desired value of $g_3$ at time instant t. This signal is fed forwardly simultaneously to a first summing junction 22 and a position controller 23, in the latter case after amplification by gain $Z_3$ in control element 26.

The output of the position controller 23 is fed as a command to the transmission 10 operation of which determines the actual vehicle position x(t) in accordance with the extent of rotation of an output shaft.

The rotational position $n_1(t)$ and $n_2(t)$ at time t of respective non-output shafts of transmission 10 are generated as the outputs of Hall-effect device, toothed wheel and counter combinations as described herein. The signals $n_1(t)$ and $n_2(t)$ are fed to a second summing junction 24 via control elements 27, 28 of respective gains $Z_1$ and $Z_2$.

In accordance with the principles set out above the resulting weighted position signal $Z_2n_2(t)$ is subtracted from weighted rotational position signal $Z_1n_1(t)$ in order to give rise to the weighted difference signal discussed previously. The weighted difference signal $Z_1n_1(t)-Z_2n_2(t)$ is subtracted in summing junction 22 from weighted desired position signal $Z_3g_{3d}(t)$ such that an error signal e(t) is fed forwardly as an input to position controller 23.

Considering the foregoing in mathematical terms:

$$Z_3\hat{g}_3(t) = Z_1 n_1(t) - Z_2 n_2(t)$$

$R_p$ is, as stated, the ratio between $g_3$ and the vehicle position x:

$$R_p x(t) = g_3(t)$$

$x_d(t)$ is the desired vehicle position. The variable e(t) shown in FIG. 4 is, neglecting the small quantization error due to the integer number of pulses that can be counted, proportional to the position error $x_d(t)-x(t)$. Indeed:

$$e(t) = Z_3 R_p x_d(t) - (Z_1 n_1(t) - Z_2 n_2(t)) =$$
$$Z_3 R_p x_d(t) - Z_3 \hat{g}_3(t) = Z_3 R_p x_d(t) - Z_3 R_p \hat{x}(t) = Z_3 R_p (x_d(t) - \hat{x}(t))$$

The advantage of computing the position error as shown in FIG. 4 is that only multiplications are necessary, and no computationally demanding divisions are required.

The desired value $g_{3d}(t)$ for $g_3(t)$ is fed to the controller to improve the accuracy of the control laws.

As is evident from the foregoing, the transmission of the invention provides for accurate, slow-speed, position-based control that is at low cost superior in performance to the arrangements available in the prior art.

Variations on the embodiments described herein are within the scope of the invention.

The invention is also considered to reside in the computational methods disclosed herein.

We claim:

1. A continuously variable transmission comprising at least one rotatable output shaft, at least one rotatable non-output shafts, and at least one continuously variable transmission elements selectively interconnecting the at least one non-output shaft and the at least one output shaft so as to permit variation of a transmission ratio therebetween,
one or more control elements for controlling the instantaneously prevailing ratio of the transmission;
one or more sensor devices for sensing the rotational position of at least one sensed, non-output shaft, and a processing device for determining the rotational position of said at least one sensed non-output shaft at a chosen instant, the processing device being operatively connected to one or more said control elements to cause variation of the transmission ratio so that said output shaft attains a desired rotational position at a chosen instant; wherein the at least one rotatable non-output shafts includes two non-output shafts, and the one or more sensor devices includes two sensor devices for respectively sensing the rotational positions of the two non-output shafts, and wherein the outputs of said sensor devices are fed to the processing device that calculates said desired rotational position of said output shaft based on the difference between the sensed rotational positions.

2. A transmission according to claim 1 wherein at least one sensor device is a Hall-effect sensor and tone wheel combination.

3. A transmission according to claim 1, further comprising a said Hall-effect sensor adjacent each said non-output shaft wherein each sensed non-output shaft includes secured thereto one or more conducting masses, that on rotation of the non-output shaft periodically generates in a said Hall-effect sensor a current that is indicative of the rotational position of the associated said non-output shaft based on the number of conducting masses or parts thereof passing the respective Hall-effect sensor.

4. A transmission according to claim 3, further comprising two sensed, non-output shafts and two corresponding said sensor devices located for respectively sensing the rotational positions of the non-output shafts and the outputs of which sensor devices are fed to the processing device that calculates the said desired rotational position of a said output shaft based on the difference between the sensed rotational positions; and
wherein the processing device is programmable and is programmed to calculate the desired rotational position $\theta_3$ of the output shaft at a chosen instant t according to an algorithm that determines a weighted difference between the number of conducting masses, or a number proportional thereto, passing each Hall-effect sensor adjacent a respective non-output shaft.

5. A transmission according to claim 4 wherein the processing device is programmed to calculate the desired rotational position $\theta_3$ of the output shaft at a chosen instant t according to the expression $$\theta_3(t) = r_1 \theta_1(t) - r_2 \theta_2(t)$$

wherein $r_1$ and $r_2$ are known constants;

$\theta_1$ is the rotational position of a first said sensed, non-output shaft at time t; and $\theta_2$ is the rotational position of a second said sensed, non-output shaft at time t.

6. A transmission according to claim 1 wherein the processing device is programmable and is programmed to calculate the desired rotational position $\theta_3$ of the output shaft at a chosen instant t according to the expression $$\hat{\theta}_3(t) = r_1 \frac{\pi}{N_1} n_1(t) - r_2 \frac{\pi}{N_2} n_2(t)$$

wherein $\hat{\theta}(t)$ represents an approximated rotational angular position value;

N is the member of conducting masses, or parts thereof, secured to each said sensed, non-output shaft n is the number of conducting masses, or parts thereof, that by time t pass an associated said Hall-effect sensor; and $r_1$ and $r_2$ are known constants, with the subscripts 1, 2 representing the first and second sensed, non-output shafts and the subscript 3 representing the output shaft.

7. A transmission according to claim 6 wherein the processing device of which includes or is operatively connected to one or more counters that count the numbers of the conducting masses or parts thereof so as to generate respective values of n relating to the non-output shafts, wherein each said counter is capable of counting to a predetermined maximum value; and wherein the processing device is programmed to subtract from each said counter an integer value so as to prevent the respective counter values from reaching or exceeding their maxima.

8. A transmission according to claim 7 wherein each said integer value is calculated as the product of a gain term and a number, less than an associated said maximum, of times a said conducting mass or part thereof passes an associated said Hall-effect device, the respective said products equaling one another.

9. A transmission according to claim 6 wherein the processing device of which includes or is operatively connected to one or more counters that count the numbers of the conducting masses or parts thereof so as to generate respective values of n relating to the non-output shafts, wherein each said counter is capable of counting to a predetermined maximum value; and wherein the processing device is programmed to reset each said counter at a predetermined time while storing a value that is proportional to the measured rotational position of the output shaft so as to prevent the respective counter values from reaching or exceeding their maxima.

10. A transmission according to claim 5 wherein the processing device approximates the values of $\theta_1(t)$ and $\theta_2(t)$ according to the expression $$\hat{\theta}(t) = \theta(0) + \frac{\pi}{T_h N} \int_0^t v(\tau) d\tau$$

wherein $\hat{\theta}(t)$ represents an approximated rotational angular position value;

$\theta(0)$ represents an initial rotational position at time t=0;

$T_h$ is the length of the output pulses of the Hall-effect sensors;

N is the number of conducting masses secured to each said sensed, non-output shaft; and $v(\tau)$ is a signal derived from the output of each respective Hall-effect sensor whereby the processing device approximates the rotational position $\hat{\theta}_3(t)$ of the output shaft according to the expression:

$$\hat{\theta}_3(t) = r_1 \hat{\theta}_1(0) - r_2 \hat{\theta}(0) = \theta_3(0) + r_1 \frac{\pi}{T_h N_1} \int_0^t v_1(\tau) d\tau - r_2 \frac{\pi}{T_h N_2} \int_0^t v_2(\tau) d\tau$$

with the subscripts 1 and 2 representing respectively the first and second sensed, non-output shafts; and the subscript 3 representing the output shaft.

11. A transmission according to claim 10 further comprising a respective monostable oscillator to which the output of each respective Hall-effect sensor is operatively connected whereby the output of each said monostable oscillator is a signal v(t) of constant pulse length $T_h$ for any rising and/or falling front of the Hall-effect sensor output signal h(t) at time t.

12. A transmission according to claim 1, wherein the transmission is operatively connected as part of a position control loop, of a wheeled and/or tracked vehicle, in which a signal representing a desired vehicle position $x_d(t)$ at time t is an input to a first control element of gain $R_p$, in which $R_p$ represents the ratio between a signal that is proportional to the rotational position of the output shaft; the output signal $g_{3d}(t)$ of the first control element is fed forwardly simultaneously to a position controller and via a control element of gain $Z_3$ as a gain-adjusted output of the first control element to a first summing junction, the output signal of the position controller being fed forwardly to the transmission and connected wheels or tracks of the vehicle, signals representing the rotational positions $n_1(t)$ and $n_2(t)$ of non-output shafts of the transmission being fed back via control elements respectively of gains $Z_1$ and $Z_2$ to a second summing junction in which a signal representing a weighted difference between the said rotational positions is generated, the said difference being further fed back to the first summing junction where it is subtracted from the gain-adjusted output of the first control element to define an error signal e(t) that is fed forwardly as an input to the position controller.

13. A transmission according to claim 12 wherein the position controller operates in accordance with the relation $$e(t) = Z_3 R_p x_d(t) - (Z_1 n_1(t) - Z_2 n_2(t)) =$$

$$Z_3 R_p x_d(t) - Z_3 \hat{g}_3(t) =$$

$$Z_3 R_p x_d(t) - Z_3 R_p \hat{x}(t) = Z_3 R_p (x_d(t) - \hat{x}(t)).$$

14. A transmission according to claim 1, in combination with a ground vehicle such that one or more said output shafts is coupled so as to cause rotation of one or more ground-engaging wheels and/or tracks of the vehicle and/or wherein the ground vehicle is a tractor, a mobile harvesting machine, a loader or a so-called multipurpose farm vehicle.

* * * * *